(12) United States Patent
Ikegame

(10) Patent No.: US 6,644,821 B2
(45) Date of Patent: Nov. 11, 2003

(54) GALVANOMETER MIRROR

(75) Inventor: Tetsuo Ikegame, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/122,657

(22) Filed: Apr. 15, 2002

(65) Prior Publication Data

US 2002/0149363 A1 Oct. 17, 2002

(30) Foreign Application Priority Data

Apr. 17, 2001 (JP) .......................................... 2001-118070

(51) Int. Cl.$^7$ .............................................. G02B 7/182
(52) U.S. Cl. ........................ 359/872; 359/871; 359/223; 359/224
(58) Field of Search .......................... 359/872, 871, 359/223, 224, 226, 196–199; 346/109

(56) References Cited

U.S. PATENT DOCUMENTS 4,186,332 A * 1/1980 Montagu ..................... 318/128
5,177,631 A * 1/1993 Orlicki et al. ............... 359/214
5,280,377 A * 1/1994 Chandler et al. ........... 359/196
5,290,377 A * 3/1994 Aihara et al. ................ 156/229

FOREIGN PATENT DOCUMENTS

| JP | 5-12686 A | 1/1993 |
|---|---|---|
| JP | 5-60993 A | 3/1993 |

* cited by examiner

Primary Examiner—Mohammad Sikder
(74) Attorney, Agent, or Firm—Frishauf, Holtz, Goodman & Chick, P.C.

(57) ABSTRACT

A galvanometer mirror is capable of inclining a reflective mirror around an axis, and has springs. An end of the spring in the vicinity of a movable part is inserted into a second holder, and is then electrically connected to each of terminals. Flexible cables are soldered to these terminals, respectively. Thus, coils are able to receive currents passing through the flexible cables and the terminals, respectively.

6 Claims, 19 Drawing Sheets

GALVANOMETER MIRROR

BACKGROUND OF THE INVENTION

1. Field of the Invention

The present invention relates to a galvanometer mirror to be used in optical devices such as information recording/regenerating devices for recording and/or regenerating information on optical media such as magneto-optical disk drives, recordable disk drives, phase transition type disk drives, CD-ROMs, DVDs and optical cards and other optical devices such as optical scanners and optical deflectors for optical communications.

2. Description of the Related Art

In these optical devices, any device for supporting an optical element such as a mirror for bending the path of a light beam has been used. As such a device, for example, Japanese Patent Application Laying-open No. 5-12686 (1993) (hereinafter, simply referred to as JPA 5-12686) discloses a galvanometer mirror to be arranged on a movable part of an optical device as shown in FIG. 1.

The galvanometer mirror shown in FIG. 1 comprises a circular reflective mirror 1, a plurality of driving coils (e.g., five driving coils) 2 wound in a generally square shape on the back surface of the reflective mirror 1 such that each of the square-shaped driving coils 2 may be symmetrical about the center of the reflective mirror 1 and the opposite shorter sides of the driving coil 2 are bent and fixed on the side surfaces of the reflective mirror 1.

The reflective mirror 1 is fixed on the top surface of a mirror-supporting part 3 mounted on a tubular housing 6 through a combination of a hinge 4 and a base 5. As shown in the FIG. 1, the hinge 4 and the base 5 are combined as an integral part concentrically formed on the back surface of the mirror-supporting part 3.

In the housing 6, there is provided a ring-shaped back yoke 7 facing to the side surface of the reflective mirror 1. In addition, there is a multi-polar magnet 8 provided on the inner peripheral surface of the back yoke 7. In this case, magnetic poles of the magnet 8 correspond to the bent portions of the driving coils 3 in a one-to-one relationship. Among the driving coils 2, a current is fed through the desired one to generate oppositely directed forces F1, F2 on the opposite sides thereof such that the refractive mirror 1 can be supported to be driven in multiple directions.

In the galvanometer mirror disclosed in the above reference (JPA 5-12686), for driving in different directions (e.g., five directions), the driving coils 2 are arranged on the movable part such that the number of the driving coils 2 matches the number of directions along which the galvanometer can be driven. In other words, for example, there are five driving coils 2 if the number of directions is five. For feeding currents to these driving coils respectively, therefore, there is a need to provide power-supply lines at least twice as much as the number of the directions (e.g., ten lines for five directions) extending from the fixed portion of the optical device to the reflective mirror 1.

However, JPA 5-12686 does not disclose or teach the power supply to the driving coils 2. If a plurality of lead wires (e.g., ten lead wires) is provided as the power-supply lines, the solidity of the lead wire may be substantially affected on the operation of the reflective mirror 1. Moreover, the form of each lead wire itself is unstable, so that the reflective mirror 1 may be inclined or the operation of the reflective mirror 1 may be varied depending on the direction. Consequently, it may become impossible to drive the reflective mirror 1 in a stable manner.

Therefore, an object of the present invention is to provide a galvanometer mirror which is able to feed a current to a plurality of driving coils easily without substantially affecting the drive of an optical element such as a reflective mirror.

DISCLOSURE OF THE INVENTION

There is provided a galvanometer mirror comprising: a movable part having an optical element and a plurality of coils; a supporting part for supporting the movable part so that the movable part can be inclined toward a predetermined plane around an axis; and a magnetic circuit for applying a magnetic field to the coils, wherein the supporting part has an elastic part that inclines the movable part around the axis by torque around the axis caused by the magnetic field and supplies electric power to the coils.

According to the present invention, the elastic part of the supporting part, such as a spring, is responsible to supply electric power to the coils, so that the need for any lead wire to be used in the power supply to the plurality of the coils can be avoided. Consequently, the power supply can be easily performed without substantially affecting the drive of the optical element such as a reflective mirror.

Preferably, the supporting part may extend in the direction along the axis, so that the optical element can be effectively driven around the axis.

Preferably, the supporting part may comprise a first portion extending in the direction along the axis and a second portion extending in the direction along another axis perpendicular to the axis. Therefore, the optical element can be not only effectively driven around the axis but also effectively driven around another axis.

Preferably, the movable part may be supported so as to be inclined toward the axis and also inclined toward another axis perpendicular to the axis. In this case, for example, the elastic part may include four springs. Each of these springs has a first end portion that extends along the axis and is fixed on the movable part and a second end portion that extends along another axis and is fixed on the movable part, and a coupling part for coupling the first end portion and the second end portion. Alternatively, the elastic part may have at least four independent springs.

BRIEF DESCRIPTION OF THE DRAWINGS

Preferred embodiments of the present invention will be explained with reference to the accompanying drawings.

BEST MODES FOR CARRYING OUT THE INVENTION

Figure 1:
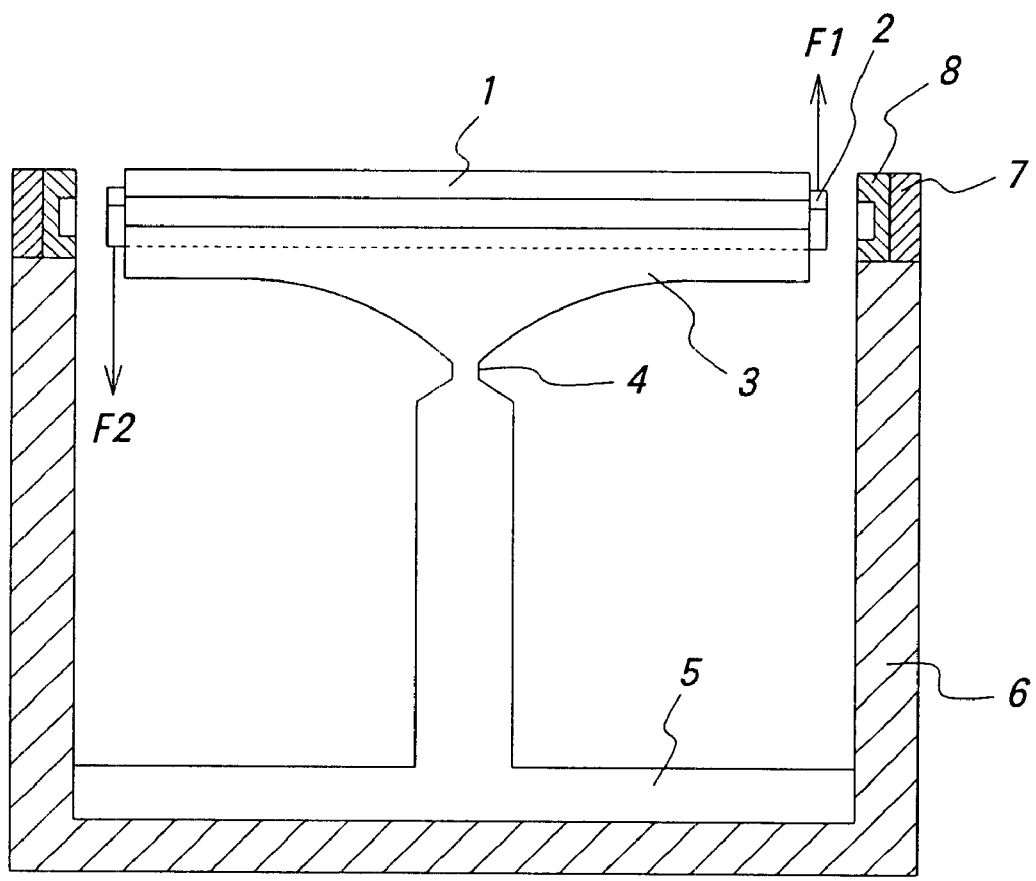
FIG. 1 is a cross sectional view of the conventional galvanometer mirror.
Figure 2:
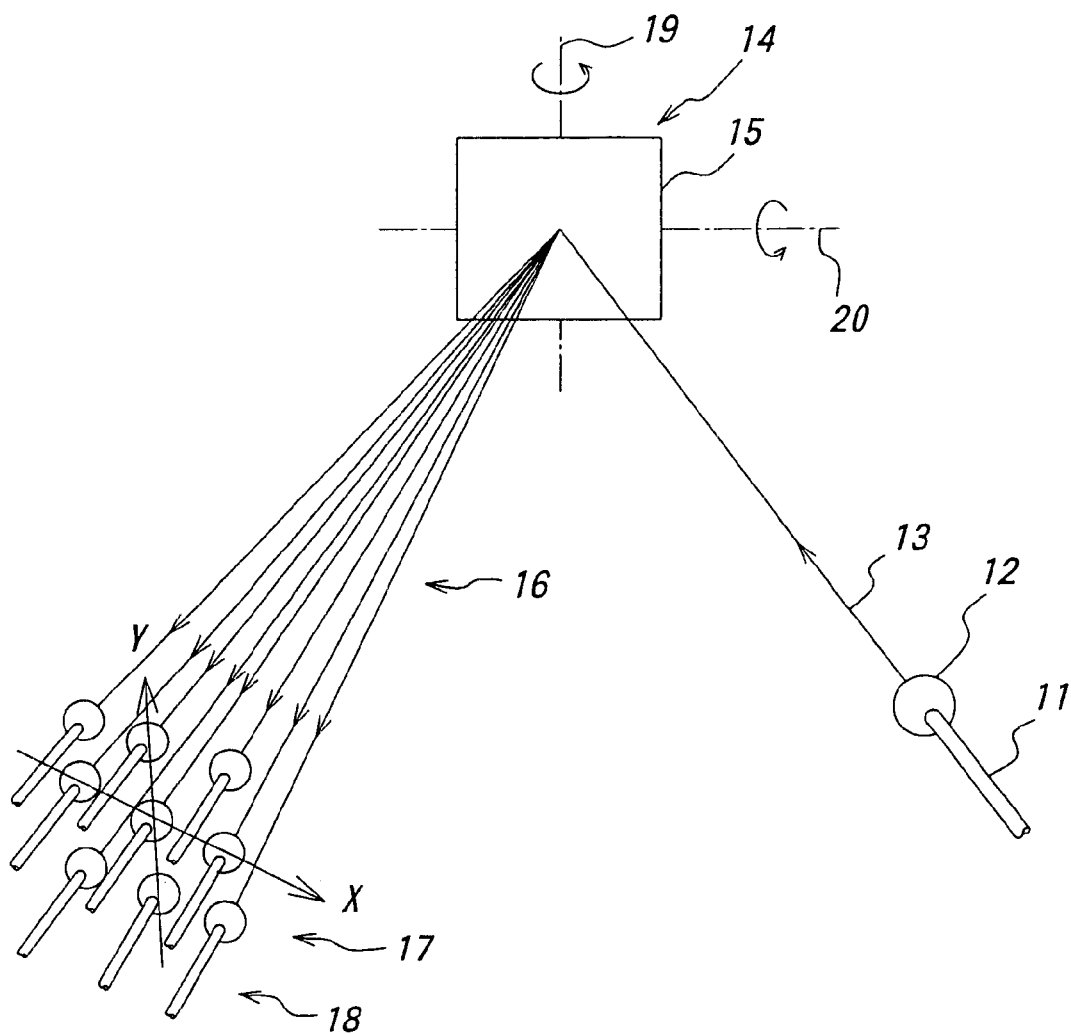
FIG. 2 is a schematic view for illustrating the galvanometer mirror as the first preferred embodiment of the present invention.
Figure 3:
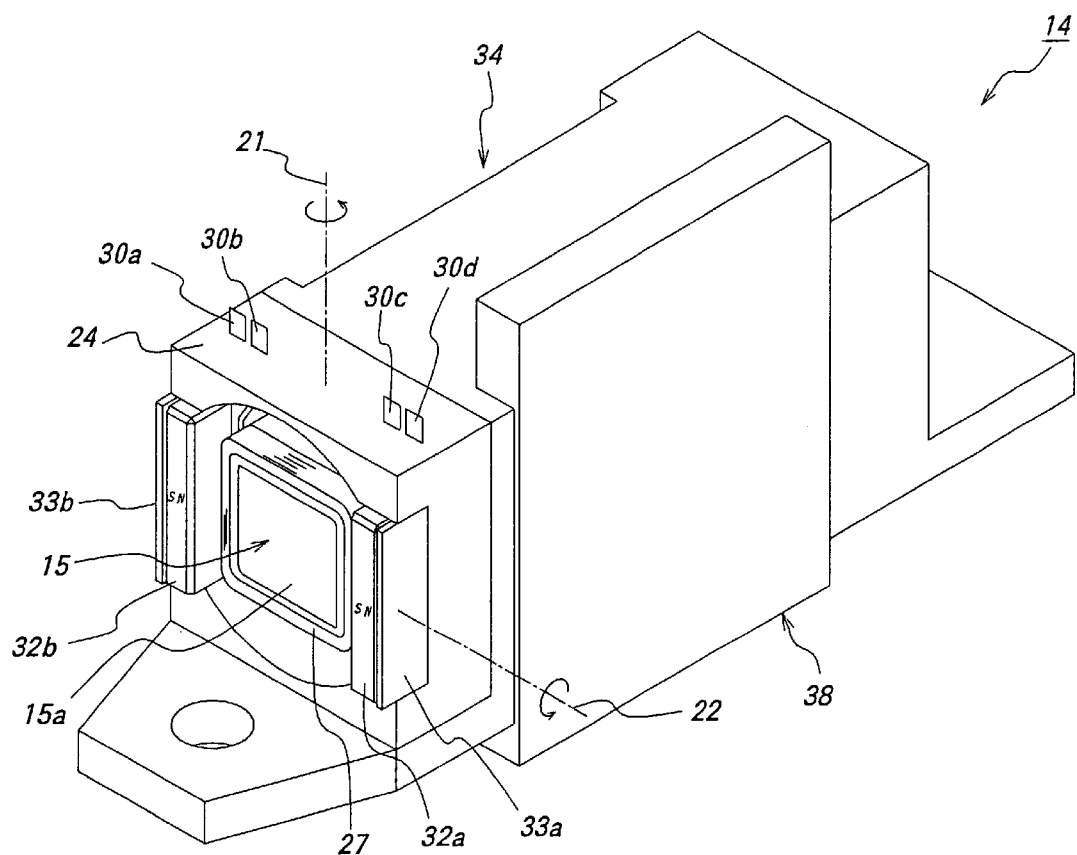
FIG. 3 is a perspective view of the galvanometer mirror as the first preferred embodiment of the present invention.

FIGS. 2 to 9 show a galvanometer mirror as a first preferred embodiment of the present invention. In this embodiment, we will describe the case in which the galvanometer is applied to an optical pass switching device for optical communications.

Beams of light for signal transmission in the optical communications, which are main beams of light generated from a single optical fiber 11, are provided as parallel ray 13 by passing through a lens 12. The parallel ray 13 is entered into a reflective mirror 15 of a galvanometer mirror 14. Reflected light 16 from the lens 12 is entered into one of nine lenses 17. As shown in the figure, these lenses 17 are all in the same plane which is substantially perpendicular to the reflected light 16 and they are arranged as a matrix with three rows and three columns. Subsequently, therefore, the reflective light 16 is selectively entered into one of optical fibers 18 corresponding to the respective lenses 17.

The reflected light 16 is inclined toward a rotation axis 19 for deflecting the reflected light 16 to left or right side in the direction X in FIG. 1. In addition or alternatively, the reflective mirror 15 may be inclined toward the rotation axis 20 for deflecting the reflected light 16 to upper or lower side in the direction Y in FIG. 1 so that the reflected light 16 may be entered into one of the lenses 17 (i.e., entered into one of the optical fibers 18 through the corresponding optical lens 17).

Therefore, one fiber is selected from nine optical fibers 18 for generating an output of light from the optical fiber 11 on the incident side. The parallel ray 13 as incident light to the reflective mirror and the reflective light 15 are main beams of light to be deflected in the reflective mirror 15 of the galvanometer mirror.

The galvanometer mirror 14 mainly comprises a supporting drive mechanism around two axes 21, 22 perpendicular to each other and a bidirectional rotary angle sensor of the reflective mirror 15.

In this embodiment, a coating material is applied on the top surface 15a of the reflective mirror 15 to be functioned as a reflective surface for obtaining a comparatively high reflectivity of main light with a wavelength of about 1.5 μm. On the other hand, another coating material is applied on the back surface 15b of the reflective mirror 15 for obtaining a comparatively high reflectivity of sensor light with a wavelength of 780 mm. Such a reflective mirror 15 is mounted in place on a mounting part 23a in the center of the first holder 23. In this case, an adhesive is applied on the inner peripheral surface of the mounting part 23a. In addition to the mounting part 23a, the first holder 23 also comprises a first molding part 23 and a second molding part 23c which will be described later.

For molding the first molding part 23a of the first holder 23 and the second holder 24 with plastic such as a liquid crystal polymer containing titanate whisker (a non-conductive plastic material), at first, four conductive springs 25a–25c that made up the elastic part 25 are shaped by means of insert molding under the conditions in which one end of the spring faces to the first molding part 23b and the other end of the spring faces to a magnet holder 24 to fold their both ends in place. Moreover, for example, the elastic part 25 may be formed by etching a beryllium copper foil of 20 μm in thickness and coating the surface of the foil with gold plating.

Subsequently, at the time of molding the second molding part 23c of the first holder 23, the first coil 26 and the second coil 27 are formed on opposite sides of the elastic part 25 by means of insert molding.

Figure 6:
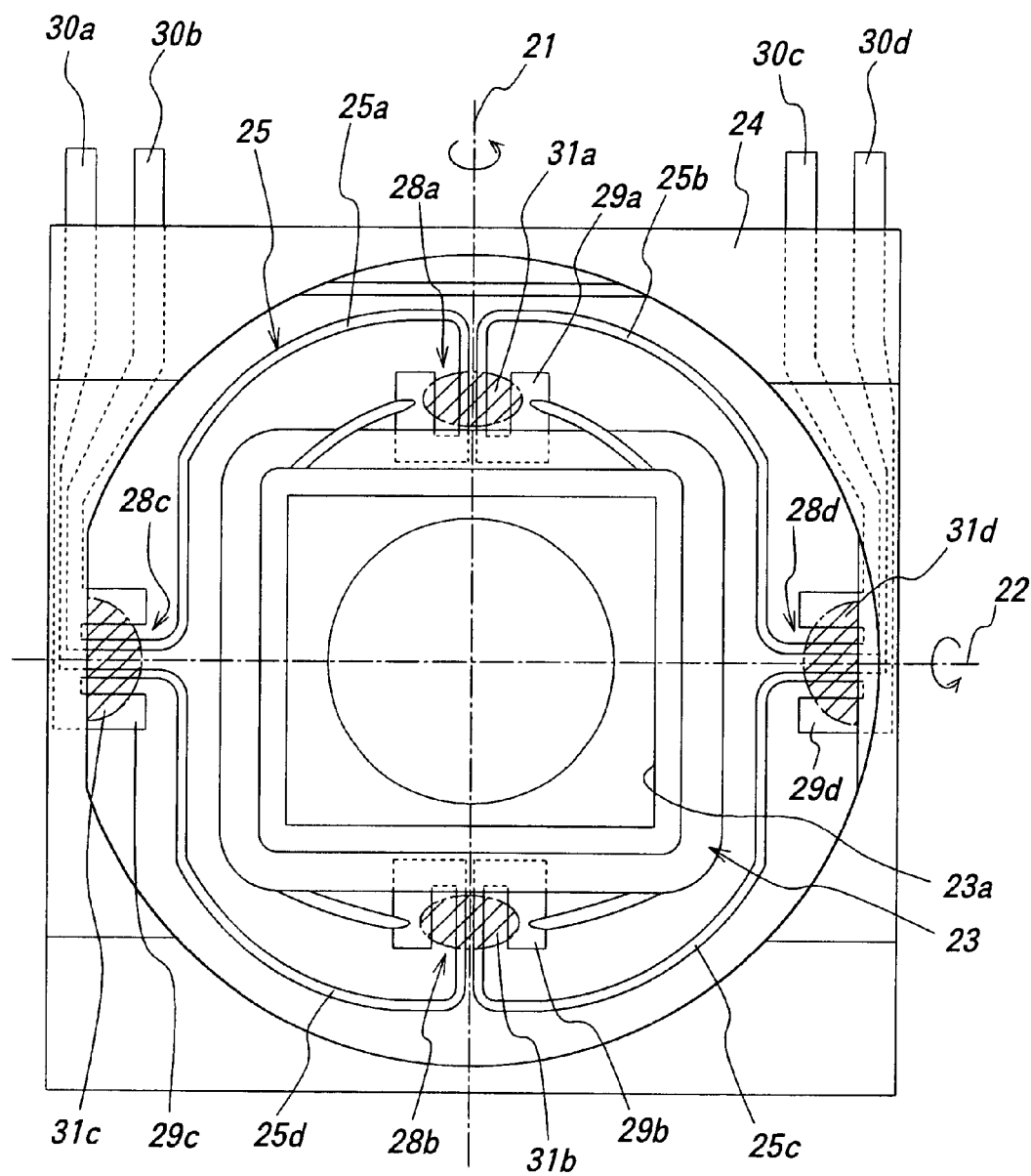
FIG. 6 is an enlarged view of the inside of the galvanometer mirror as the first preferred embodiment of the present invention.

Referring mainly to FIG. 6, here, we will describe the elastic part 25.

The springs 25a–25d are arranged such that they surround four corners of the first holder 23. First end portions of the respective springs 25a, 25b are respectively fixed on in close proximity to an axis 21 corresponding to the rotation axis of the first holder 23, and also a variable part 28a is constructed in the vicinity of the springs 25a, 25b. Similarly, first end portions of the respective springs 25c, 25d are respectively fixed on in close proximity to the axis 21 corresponding to the rotation axis of the first holder 23, and also a variable part 28c is constructed in the vicinity of the springs 25a, 25b. Furthermore, second end portions of the respective springs 25a, 25b are respectively fixed on in close proximity to an axis 22 corresponding to the rotation axis of the second holder 24, and also a variable part 28c is constructed in the vicinity of the springs 25a, 25b. Similarly, second end portions of the respective springs 25c, 25d are respectively fixed on in close proximity to the axis 22 corresponding to the rotation axis of the second holder 24, and also a variable part 28d is constructed in the vicinity of the springs 25c, 25d. These first end portions of the springs 25a–25d are coupled to their respective second end portions of the springs 25a–25d through their coupling parts. In the present embodiment, a supporting part can be comprised of four independent springs 25a–25c that constitute the corresponding variable parts 28a–28d respectively.

In the vicinities of the variable parts 28a, 28b, soldering parts 29a, 29b are arranged respectively, which are connected to each other in the first holder 23. In addition, both ends of coils 26, 27 are fixed on the soldering parts 29a, 29b by means of a conductive adhesive, respectively.

The end portions of the respective springs 25a–25d in the vicinities of the variable parts 28c, 28d are inserted in the second holder 24 and are then electrically connected with terminals 30a–30d, respectively. Then, these four terminals 30a–30d are soldered to their respective flexible cables, so that the coils 26, 27 can be supplied with electric power through the flexible cables and the terminals 30a–30d.

In addition to the soldering parts 29a, 29b, other protruding parts 29c, 29d are connected with each other in the first holder 23. Also, damping materials 31a–31d are filled between the variable part 28a, 28b and the soldering part 29a, 29b and between the variable part 28c, 28d and the protruding parts 29c, 29d, respectively. Consequently, damping effects can be obtained at the opposite ends of each spring 25–25d. In this embodiment, the damping materials 31a–31d may be made of ultraviolet-curing silicon gel.

Figure 4:
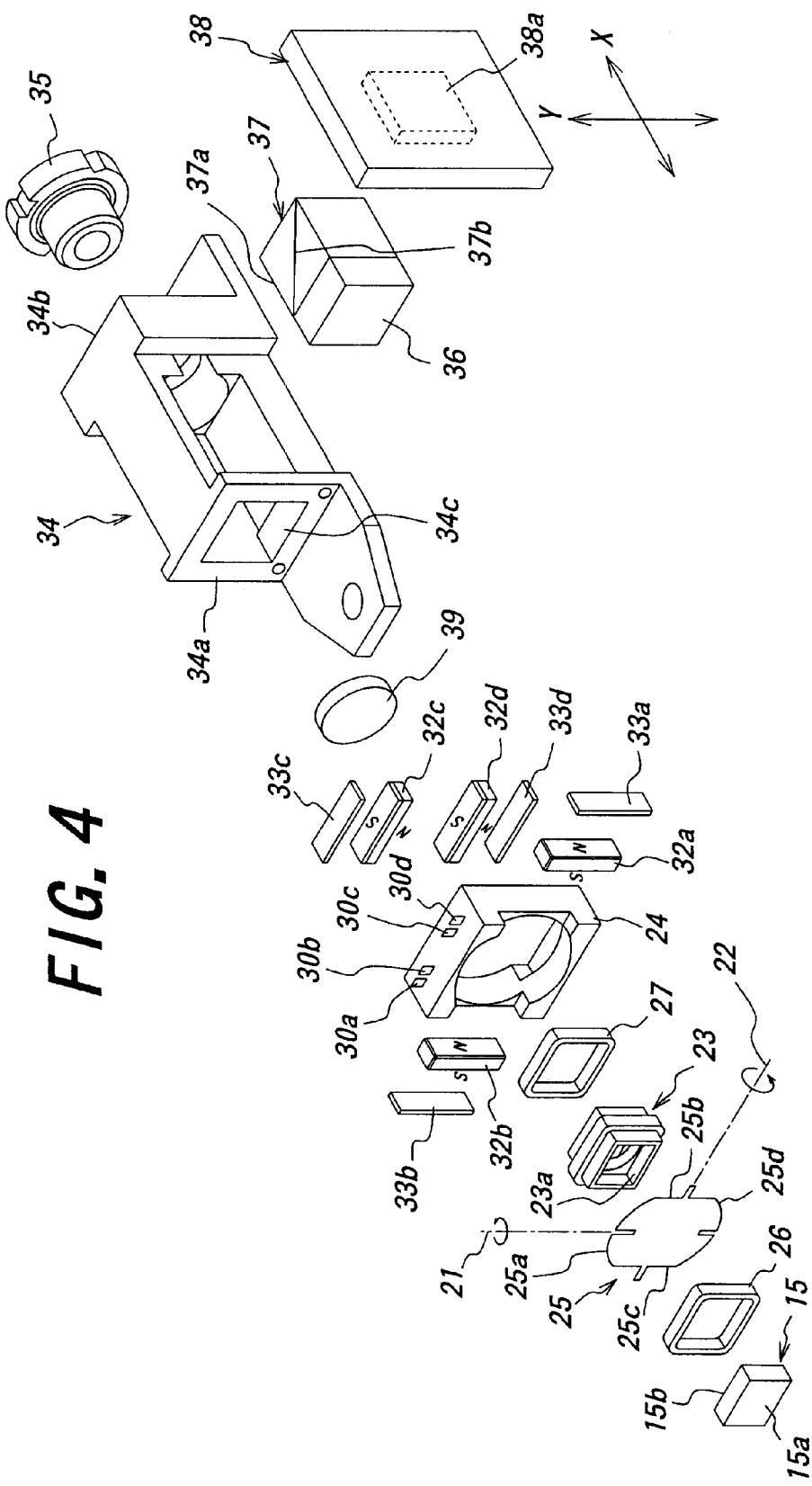
FIG. 4 is an exploded perspective view of the galvanometer mirror as the first preferred embodiment of the present invention.
Figure 5:
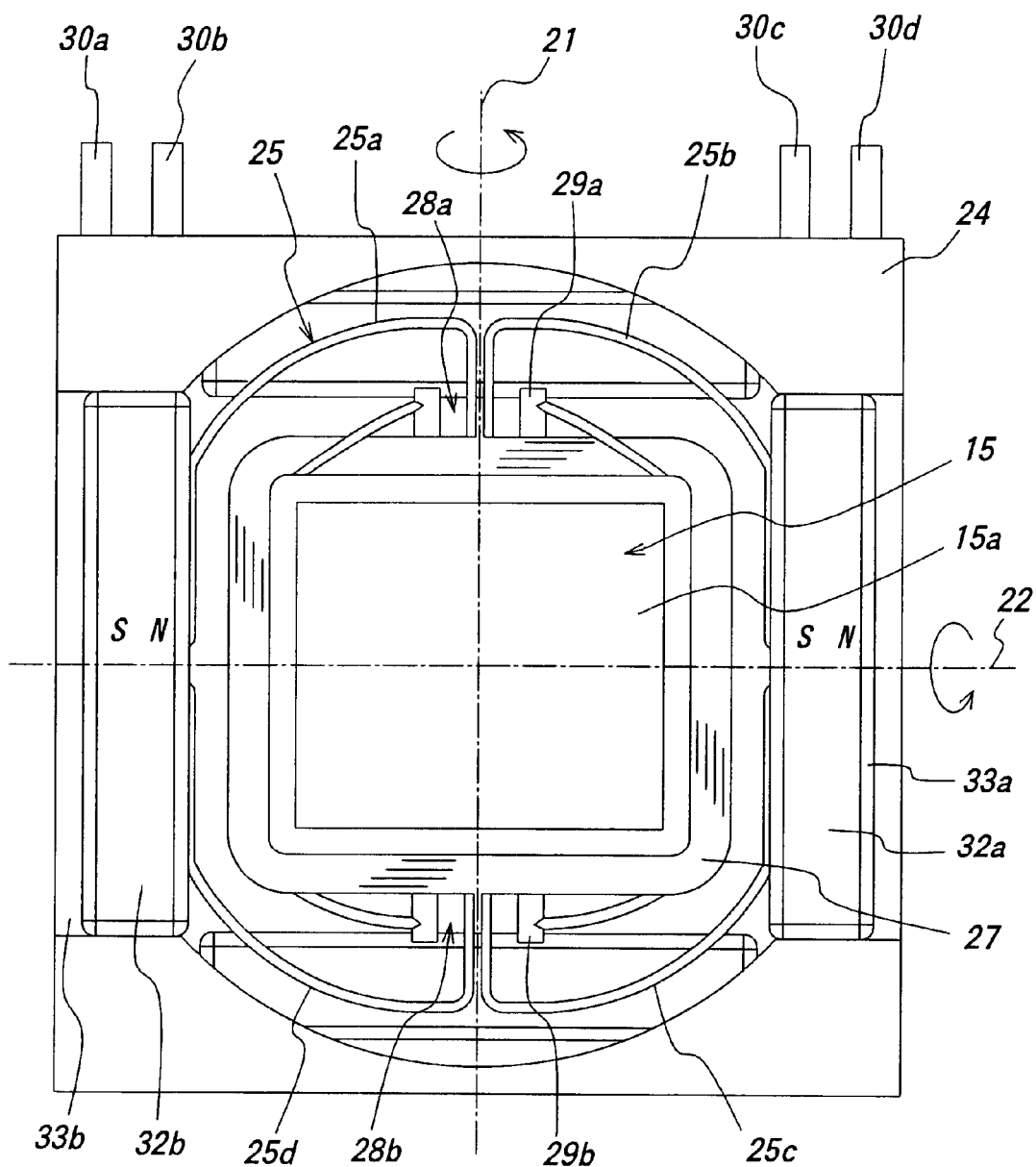
FIG. 5 is an enlarged view of the inside of the galvanometer mirror as the first preferred embodiment of the present invention.

As shown in FIG. 4, two magnets 32a, 32b for the coil 26 are arranged such that a yoke 33a is attached on one end of the magnet 32a and a yoke 33b is attached on one end of the magnet 32b. In addition, the other end of each magnet 32a, 32b is attached on the surface of the second holder 24. Similarly, two magnets 32c, 32d for the coil 27 are arranged such that a yoke 33c is attached on one end of the magnet 32c and a yoke 33d is attached on one end of the magnet 32d. In addition, the other end of each magnet 32c, 32d is attached on the surface of the second holder 24. The second holder 24 is in the shape of a square and is attached on a mounting surface 34a of a housing 34 molded by means of zinc die casting.

Figure 7:
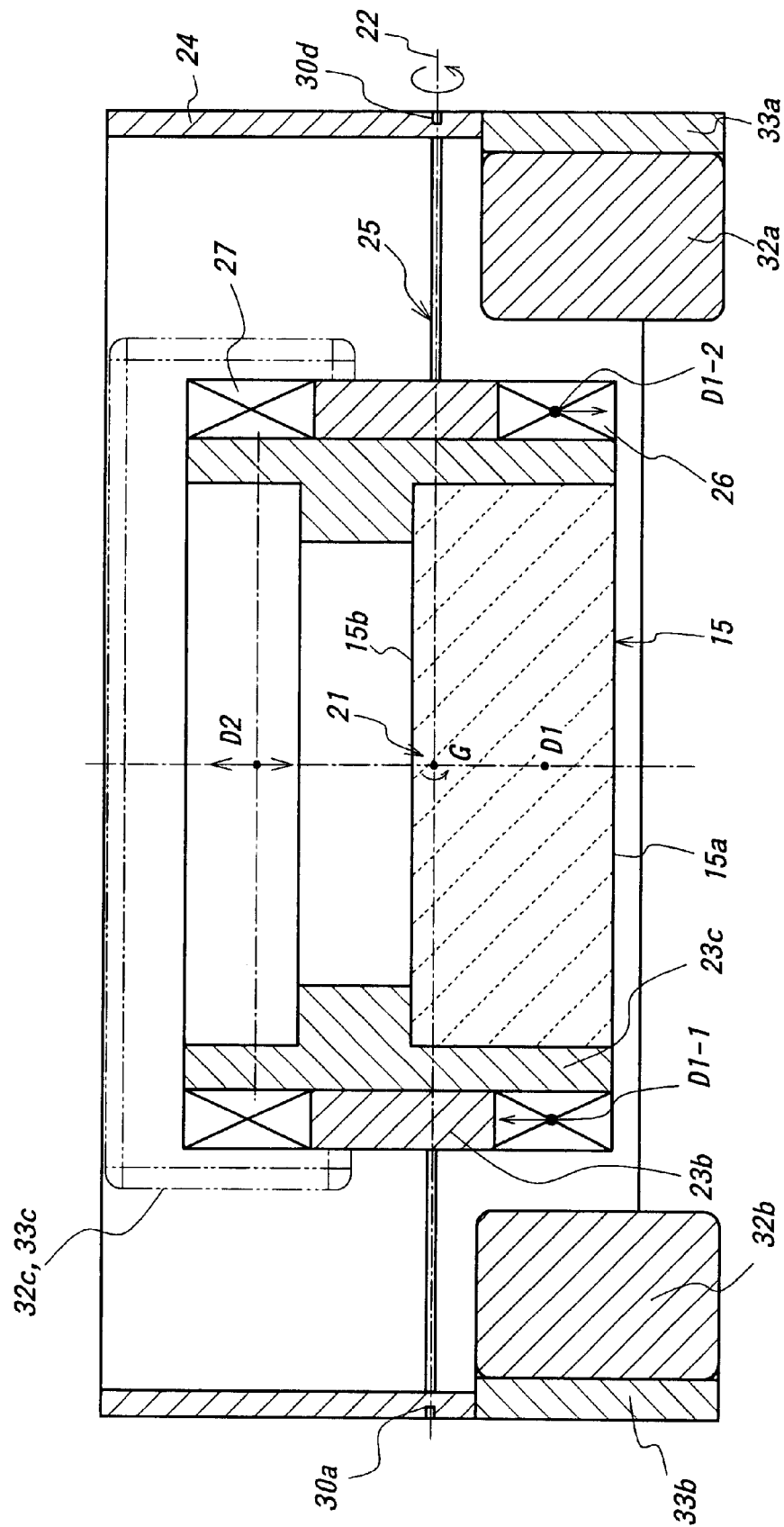
FIG. 7 is a cross sectional view of the galvanometer mirror as the first preferred embodiment of the present invention.
Figure 8:
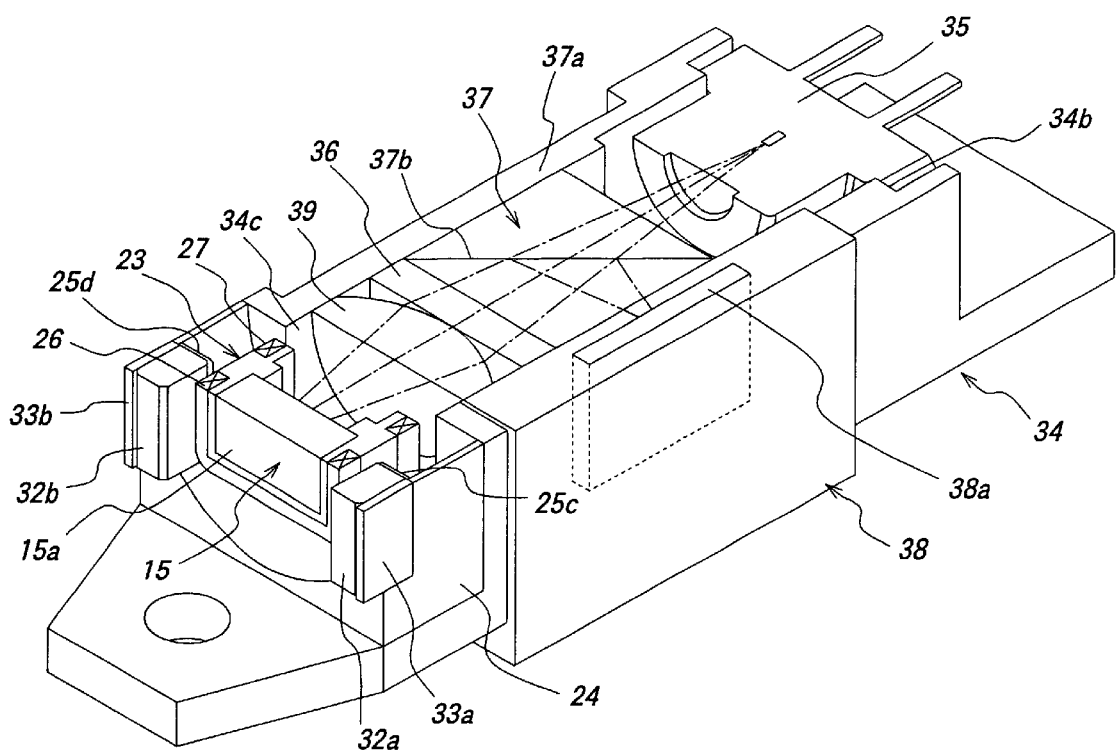
FIG. 8 is a cross sectional perspective view of the galvanometer mirror as the first preferred embodiment of the present invention.

In the present embodiment, a movable part is comprised of the reflective mirror 15, the first holder 23 and the coils 26, 27. As shown in FIG. 7, the center of gravity G of the movable part is located on the axes 21, 22. In addition, the principal axis of inertia of the movable part corresponds to the axes 20, 21. Furthermore, the elastic part 25 is arranged on the plane constituted by the axes 21, 22. The variable parts 28a, 28b are arranged in the vicinity of the axis 21, and the variable parts 28c, 28d are arranged in the vicinity of the axis 22.

Figure 9:
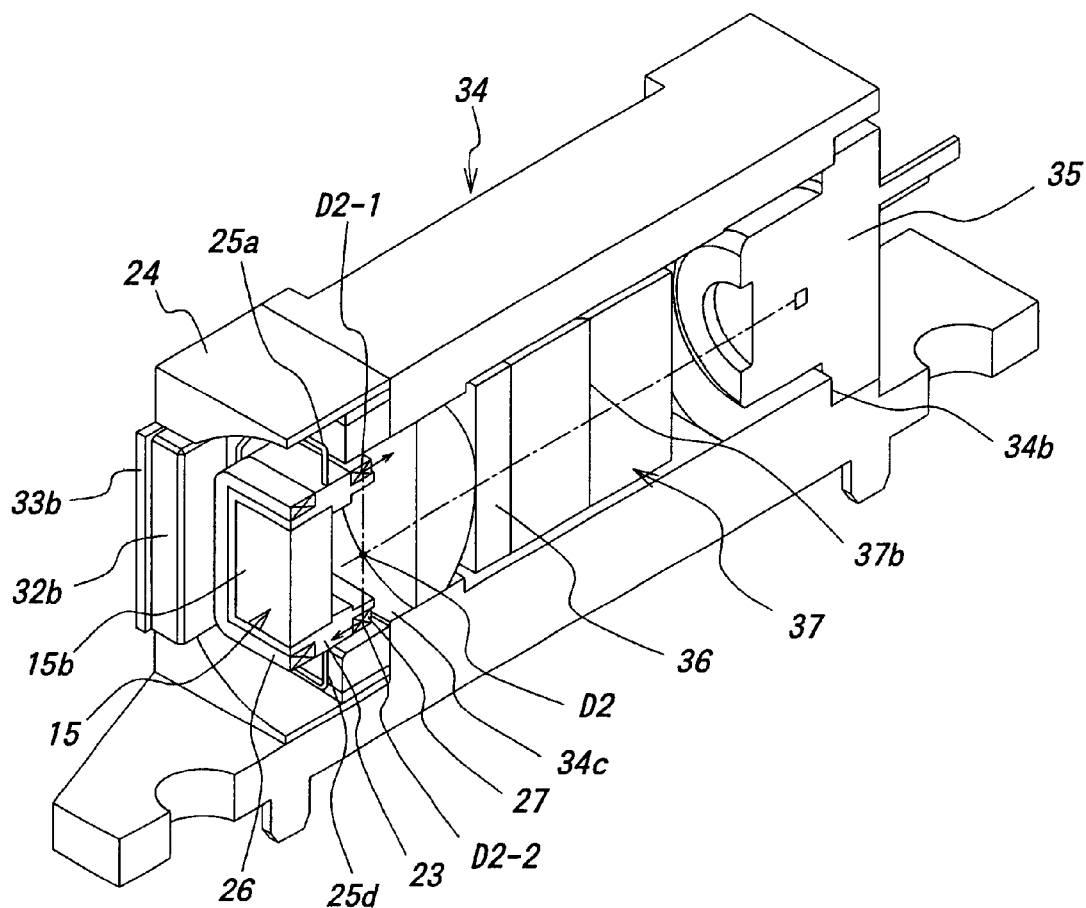
FIG. 9 is a cross sectional perspective view of the galvanometer mirror as the first preferred embodiment of the present invention.
Figure 10:
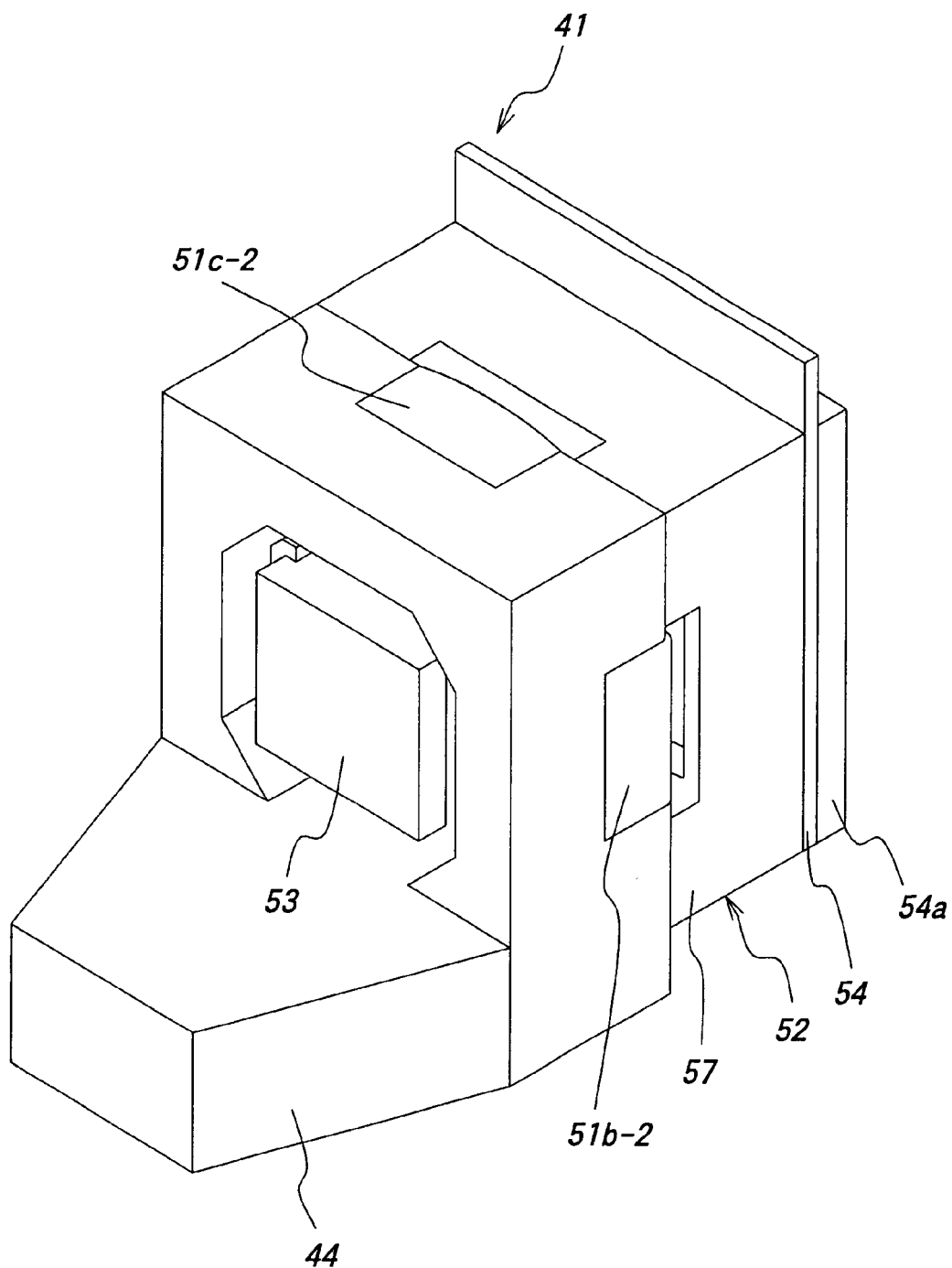
FIG. 10 is a perspective view of the galvanometer mirror as the second preferred embodiment of the present invention.

Comparing with the coil 27, the coil 26 is located at the position near the elastic part 25. Consequently, the position at the center of gravity including the reflective mirror 15 can be brought into line with the axes 21, 22 without a need for any balancer. In addition, forces generated in the coil 26 are those generated upward and downward at driving points D1-1, D1-2 in FIG. 7, respectively. Consequently, torque centered on the driving center D1 can be generated. In the coil 27, furthermore, forces are generated on the side extending in the direction parallel to the plane of FIG. 7. In other words, as shown in FIG. 9, such forces are generated at the driving points D2-1, D2-2 in the direction along which the housing 34 extends. As a result, torque centered on the driving center D2 can be generated.

The housing 34 includes a sensor for detecting the inclination of the reflective mirror 15. Such an inclination sensor has a laser 35 as its optical source press-inserted into an opening 34b of the housing 34. In addition, the contact surface 37a of a polarized beam splitter (PBS) 37, on which a quarter wave plate 36 is jointed, is bonded on the wall of the housing 34.

As shown in the figure, a position sensing device (PSD) 38 is also mounted on the housing 34. In this embodiment, the PSD 38 may be a two-dimensional position sensor such as one available as type No. 5990-01, S7848-01 or the like from Hamamatsu Photonics K.K., Japan. The sensor generates an output voltage that represents the bidirectional center position of the amount of light projected on a light-receptive part 33a. Furthermore, a lens 39 is inserted into another opening 34c of the housing and is fixed in place by an adhesive.

Now, we will describe the operation of the present embodiment as follows.

If a current is passed through the coil 26 via two of four springs 25a–25d, torque is caused around the axis 21 by a magnetic field generated from the magnets 32a, 32b. Principally, the torque causes distortions of movable parts 28a, 28b, so that the movable parts 28a, 28b can be inclined toward the axis 21.

On the other hand, if a current is passed through the coil 27 via other two of four springs 25a–25d, torque is caused around the axis 22 by a magnetic field generated from the magnets 32c, 32d. Principally, the torque causes distortions of movable parts 28c, 28d, so that the movable parts 28c, 28d can be inclined toward the axis 22.

The light generated from the laser 35 is entered as P-polarized light into PBS 37. Then, the light passes through the polarization plane 27b, the quarter wave plane 36 and the lens 50, followed by introducing into the reflective mirror 15. The incident light in the reflective mirror 15 is reflected by the back surface 15b thereof, followed by passing through the quarter wave plate 36. Subsequently, the light is reflected by the polarization plane 37b with S-polarized light in which the plane of polarization is rotated 90 degrees. Consequently, the light is introduced into the light-receptive part 38a.

If the reflective mirror 15 is inclined toward the axis 21, the light on the light-receptive part 38a travels in the direction X in FIG. 4. If the reflective mirror 15 is inclined toward the axis 22, the light on the light-receptive part 38a travels in the direction Y in FIG. 4. Therefore, we can detect the inclination of the reflective mirror 15 in two directions on the basis of the output from the PSD 38.

According to the present embodiment, four conductive springs 25a–25d are used as independent supporting parts, so that these springs can be also used as four plus and minus power-supply lines in total for the coils 26, 27 which can be driven in two directions. Consequently, there is no need to use any power-supply means for movable parts, such as a flexible cable, substantially avoiding bad influences on the conditions of supporting and driving the reflective mirror 15.

Furthermore, as described above, the opposite ends of each of four springs 25a–25d are formed in the second holder 24 made of a non-conductive plastic material by means of insert molding. Such a configuration prevents these springs 25a–25d from contacting with each other and allows that they can be easily positioned in place at ease. In the second holder 24, Moreover, the springs 25a–25d make up soldering parts 29a, 29b though the inside from the portion subjected to the insert molding respectively, so that the electrical contacts to the springs 25a–25d can be easily performed.

In the galvanometer mirror of the present embodiment, in which the is optical element such as the reflective mirror 15 is inclined toward two axes, two coils 26, 27 integrated with the reflective mirror 15 to be inclined in the directions of two axes are arranged such that they sandwich the springs 25a–25d provided as supporting parts, including the center of rotation around two axial directions. Consequently, the center of torque to be generated at the time of actuating the coils 26, 27 can be largely deviated from the supporting parts and the center of rotation. In addition, the barycenter G of the coils 26, 27 can be easily brought into line with the center of rotation, so that the establishment of resonance can be substantially prevented at the time of actuating the coils 26, 27, so that the servo characteristics can be improved.

The coils 26, 27 are arranged on the both sides of the elastic part 25 that makes up the supporting part and are separated from the back surface 15b of the reflective mirror 15, i.e., the reflective surface thereof in the vertical direction. Therefore, these two coils 26, 27 and magnets 32a–32d that make up magnetic circuits for these coils 26, 27 are easily arranged in place without causing any interference between them. As a result, the deviation with the supporting part can be minimized even though the coils 26, 27 are separated from the back surface 15a in the vertical direction. Thus, the magnets 32a–32d can be easily arranged in place, and also the fluctuations in a magnetic field to be applied on the coils 26, 27 and the magnetic interference among magnets 32a–32d can be reduced.

According to the present embodiment, furthermore, the damping materials 31a–31d are provided on the opposite ends of the springs 25a–25d, respectively. Thus, the oscillation of each spring 25a–25d can be strongly prevented. Furthermore, the light-receptive part 38a of the PSD 38 functioned as a sensor of detecting the inclination of the reflective mirror 15 is arranged on the back surface 15b, i.e., the side opposite to the top surface 15a of the reflective mirror 15 provided as a main reflective surface for incident light, so that most of light cannot effect on the light-receptive part 38a substantially.

Referring now to FIGS. 10 to 16, we will describe a galvanometer mirror as a second preferred embodiment of the present invention. The galvanometer mirror 41 of the present embodiment comprises: a first holder 43 made of a nonconductive plastic material in which four springs 42a–42d constituting an elastic part 32 are formed by means of insert molding; and a second holder 44 made of a nonconductive plastic material.

Figure 15:
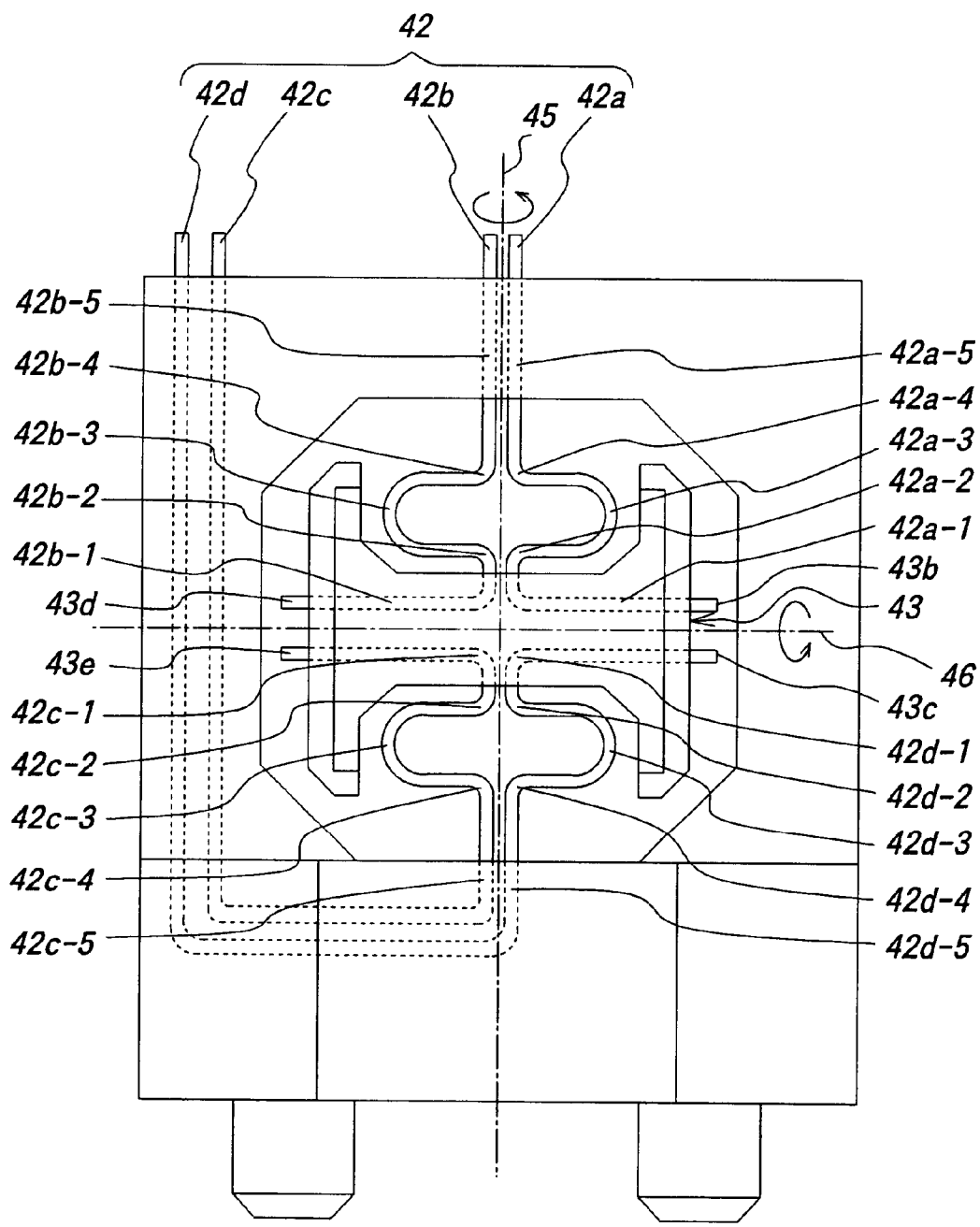
FIG. 15 is a cross sectional view of the galvanometer mirror as the second preferred embodiment of the present invention.
Figure 16:
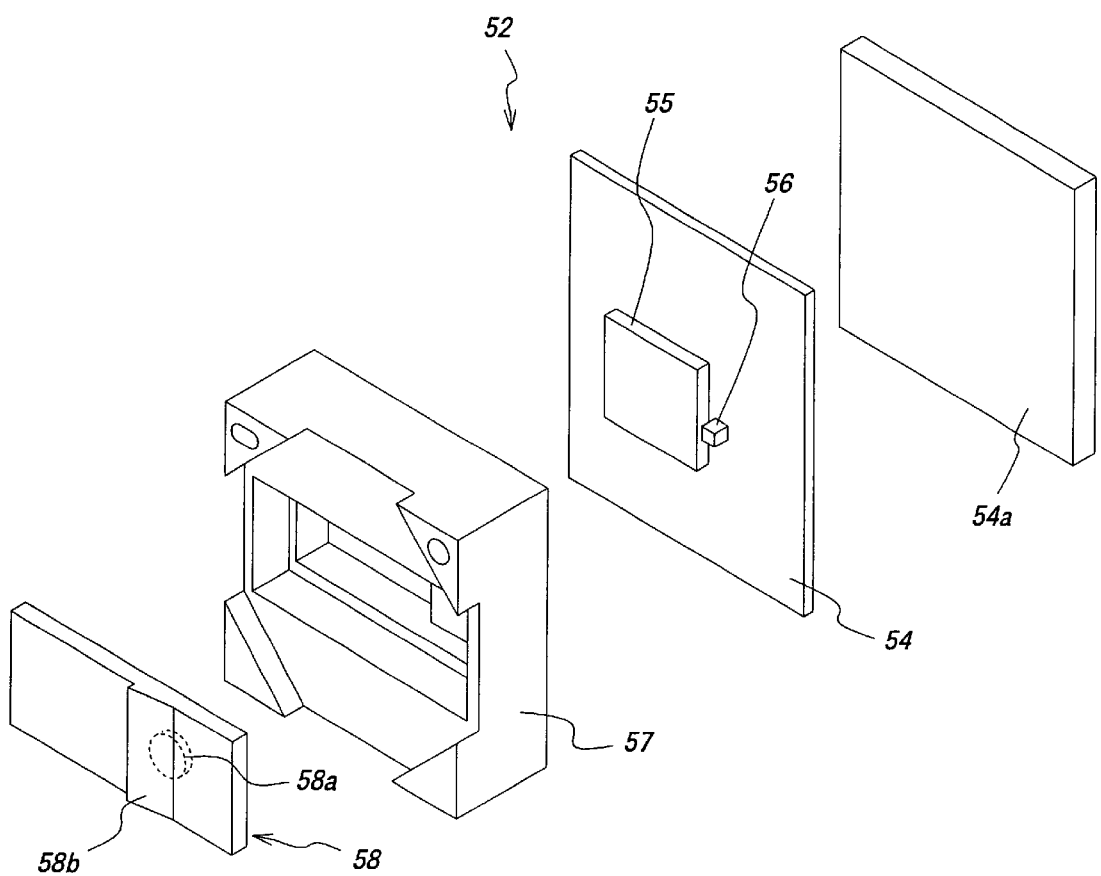
FIG. 16 is an exploded perspective view of the sensor to be equipped in the galvanometer mirror as the second preferred embodiment of the present invention.

As shown in FIG. 15, each of these four springs 42a–42d comprises: a first end portion 42a-1–42d-1 fixed on the first holder 43; a first bending portion 42a-2–32d-2 coupled to the first end portion 42a-1–42d-1 and extended in parallel to an axis 46 so as to be apart from an axis 45; a U-shaped second bending portion 42a-3–42d-3 coupled to the first bending portion 42a-2–42d-2; a third bending portion 42a-4–42d-4 coupled to the second bending portion 42a-3–42d-3 and extended in parallel to an axis 45 so as to be apart from an axis 46; and a second terminal 42a-5–42d-3 fixed on the second holder 44 and coupled to the third bending portion 42a-4–42d-4. In this case, the axes 45, 36 correspond to the axes 21, 22 of the first preferred embodiment, respectively. The first bending portion 42a-2–42d-2, the second bending portion 42a-3–42d-3, and the third bending portion 42a-4–42d correspond to the above coupling parts, respectively.

Four trapezoidal coil parts 47a–47d of the galvanometer mirror 41 is bonded on the surface of a substrate 48. Each terminal of the respective trapezoidal coils 47a–47d is soldered to a land on the substrate 48. The coil part 47a is connected to the coil part 47b, while the coil part 47c is connected to the coil part 47d. In other words, a set of the coil parts 47a, 47b acts as the first coil described above and a set of the coil parts 47c, 47d acts as the second coil described above. Therefore, these fore coil parts 47a–47d can be provided as a single unit together with the substrate 48, so that the fabrication of such a galvanometer mirror 41 may become more easily.

Furthermore, the substrate 48 is bonded on one surface of the first holder 43 and a silicon mirror 49 is bonded on a protruding portion 43a formed on the other surface of the first holder 43. Four soldering parts 43b–43e extending in the direction from the first holder 43 and in parallel with the axis 46 are soldered to lands on the substrate 48, respectively. Consequently, the soldering parts 43b–43e are connected to the ends of four coil parts in total (i.e., each end of the coil parts 47a, 47b that make up the first coil and each end of the coil parts 47c, 47d that make up the second coil), so that currents can be provided from the second end portion 42a–542d-5 to the first and second coils through four springs 42a–42d, respectively.

There are magnetic gaps formed by the magnets and sensor yokes 51a-1–51d-1 of the yoke 51. Parts of the respective coil parts 47a-47–d are arranged in the magnetic gaps, respectively. All of the magnets 50a–50d connects to their respective side yokes 51a-2–51d-2 of the yoke 51 such that a north pole of each magnet is placed inward. In addition, the yoke 1 is shaped using press molding. The sensor yokes 51a-1–51d-1 are bent such that they face the corresponding side yokes 51a-2–51d-2, respectively.

The yoke 51 is fixed on the back surface of the second holder 44, and a sensor 52 is fixed on the back side of the yoke 51. Thus, four magnets 50a–50d are assembled as a single unit, so that the fabrication may become more easily. In addition, the reflective mirror 53 is arranged on the first holder 43.

Next, the operation of the present embodiment will be described. If a current is fed through each of the coil parts 47a, 47b that make up the first coil via each of two springs 42a, 42b, torque is generated around the axis 45 by a magnetic field. The movable part comprised of the first holder 43, the coil parts 47a–47d, the substrate 48, the silicon mirror 49 and the reflective mirror 53 rotates around the axis 45. At this time, the third bending portions 42a-4–42d-4 become deformed to impart a rotary motion to the movable part.

On the other hand, if current is fed through each of the coil parts 47c, 47d that make up the second coil via each of two springs 42c, 42d, torque is generated around the axis 46 by a magnetic field. The movable part rotates around the axis 46. At this time, the first bending portions 42a-2–42d-2, the second bending portions 42a-3–42d-3 and the bending portions 42a-4–42d-4 are mainly deformed to impart a rotary motion to the movable part.

In the present embodiment, the U-shaped second bonding portions 42a-3–42d-3 are provided, so that they can be deformed to change the distance between the end portions of the U-shape. Consequently, the solidity of each spring 42a–42d in the direction of inclining the reflective mirror 53 toward the axis 46 can be decreased to improve the sensitivity of the galvanometer.

In addition, with respect to the first holder 43, the springs 42a–42d are positioned in the direction parallel to the axis 45 but not in the direction parallel to the axis 46. As a result, the soldering parts 43b–43e can be arranged in the direction in parallel with the axis 46 on which the springs 42a–42d are not located, allowing the soldering process more easily.

Furthermore, each of the first end portions 42a-1–42d-1 of the respective springs 42a–42d can be placed in the vicinity of the rotation axis 46, so that the solidity around the rotation axis 46 can be decreased to improve the sensitivity of the galvanometer mirror.

Figure 13:
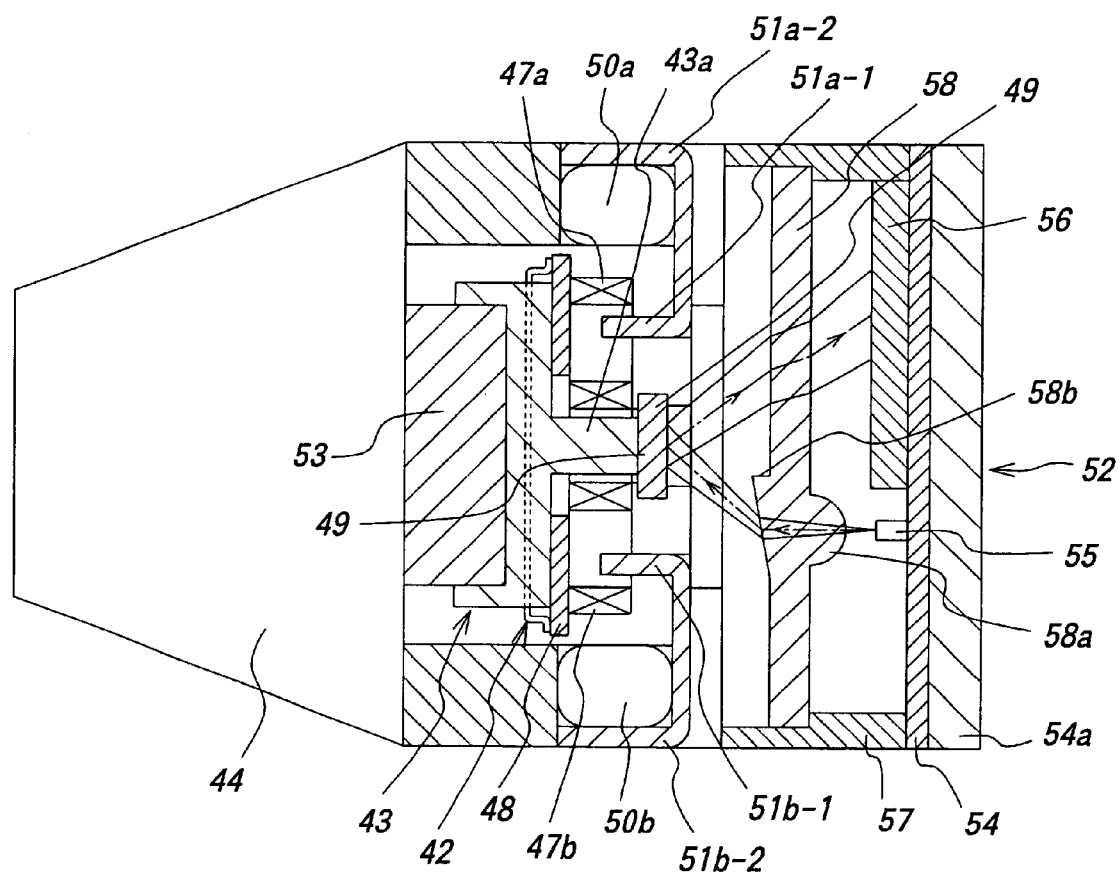
FIG. 13 is a cross sectional view of the galvanometer mirror as the second preferred embodiment of the present invention.
Figure 14:
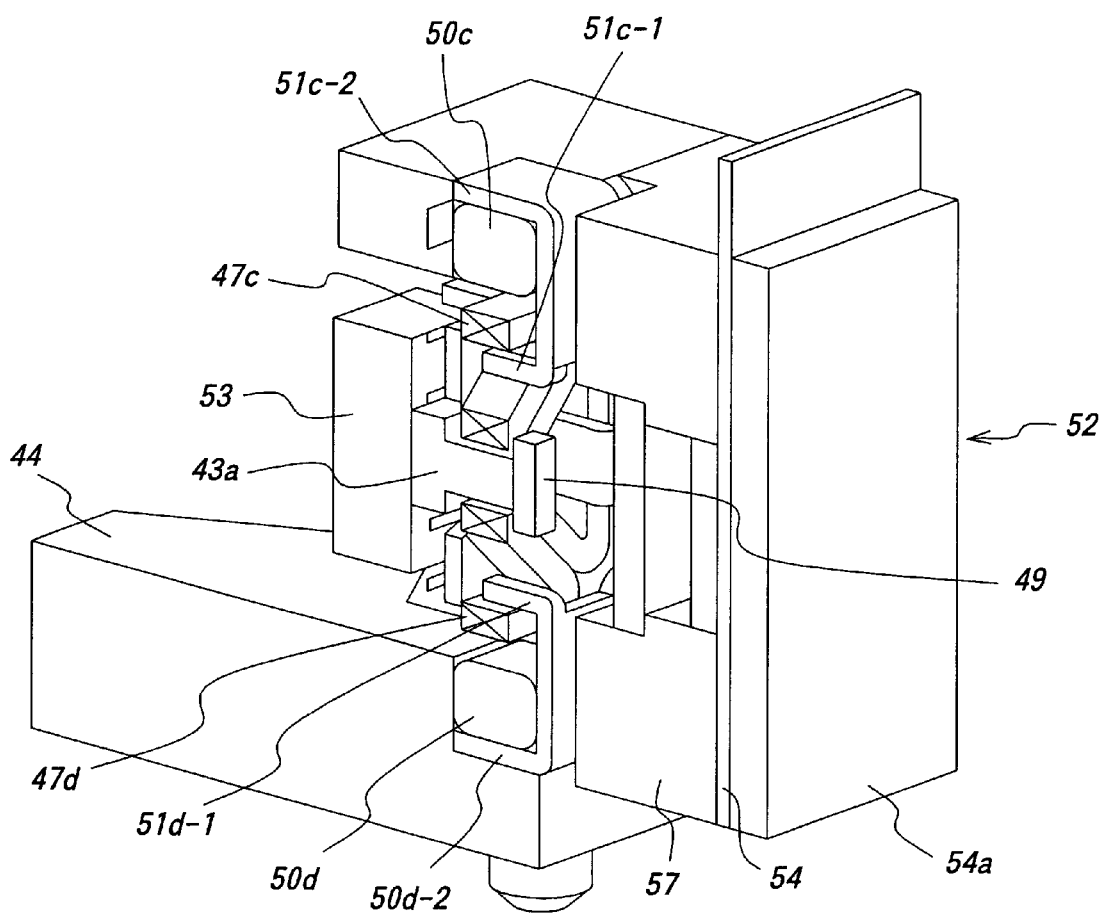
FIG. 14 is a cross sectional perspective view of the galvanometer mirror as the second preferred embodiment of the present invention.

Here, the sensor 52 will be described as follows. As shown in FIG. 13, a reinforcing plate 4*a* made of an aluminum plate is fixed on one surface of a flexible substrate 54 and a LED chip 55 and a PSD 56 provided as a two-dimensional position sensor are fixed on the other surface of the flexible substrate 54.

The flexible substrate 54 is mounted on a housing 57 made of a plastic material. In addition, an opening of the housing 57 is covered with a cover glass 58 made of a transparent optical plastic material. There are a hemispherical lens 58*a* and a wedge-shaped prism 58*b* formed on the cover glass 58 such that they are located on the place facing to the LED chip 56.

Rays of light generated from the LED chip 55 are formed as generally parallel rays through the lens 58*a* and then entered into the prism 58*b*. Subsequently, the pass of light generated from the prism 58*b* is bent to the silicon mirror 49. The light reflected by the silicon mirror is introduced into the PSD 56.

If the silicon mirror 49 rotates around the axes 45, 46, then the reflected light from the silicon mirror 49 is inclined and the incident light to the PSD 56 moves in two directions. Consequently, the inclination of the reflective mirror 53 can be detected.

According to the present embodiment, the sensor 52 is fabricated as a unit assembly, so that it can be handled easily. In addition, the lens 58*a* and the prism 58*a* are integrally molded together and light from the LED chip is diagonally projected against the silicon mirror 49. Therefore, there is no need to provide a complicated optical system using the PBS, the quarter wave plate and so on, which is used in the first embodiment, allowing the fabrication of the galvanometer mirror at very low cost.

Figure 17:
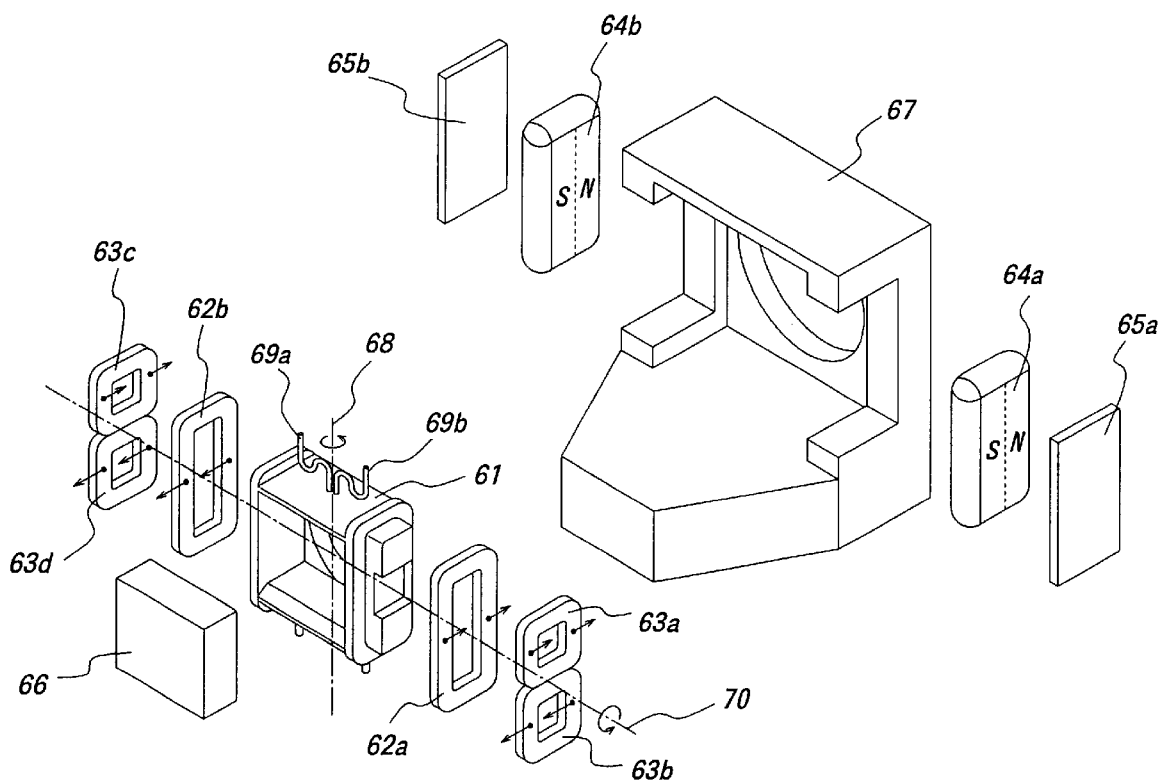
FIG. 17 is an exploded perspective view of the galvanometer mirror as the third preferred embodiment of the present invention.
Figure 18:
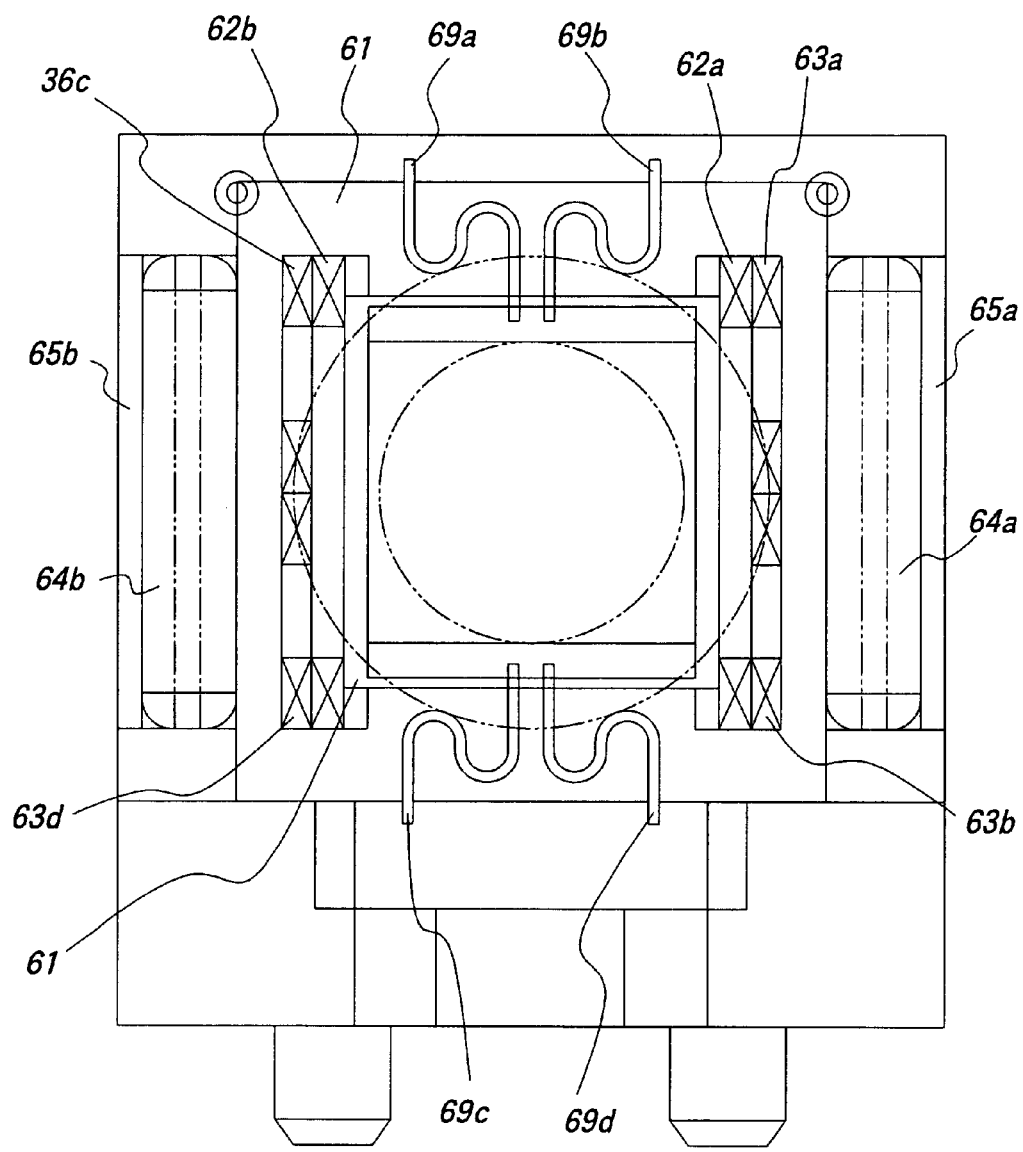
FIG. 18 is a cross sectional view of the galvanometer mirror as the third preferred embodiment of the present invention.
Figure 19:
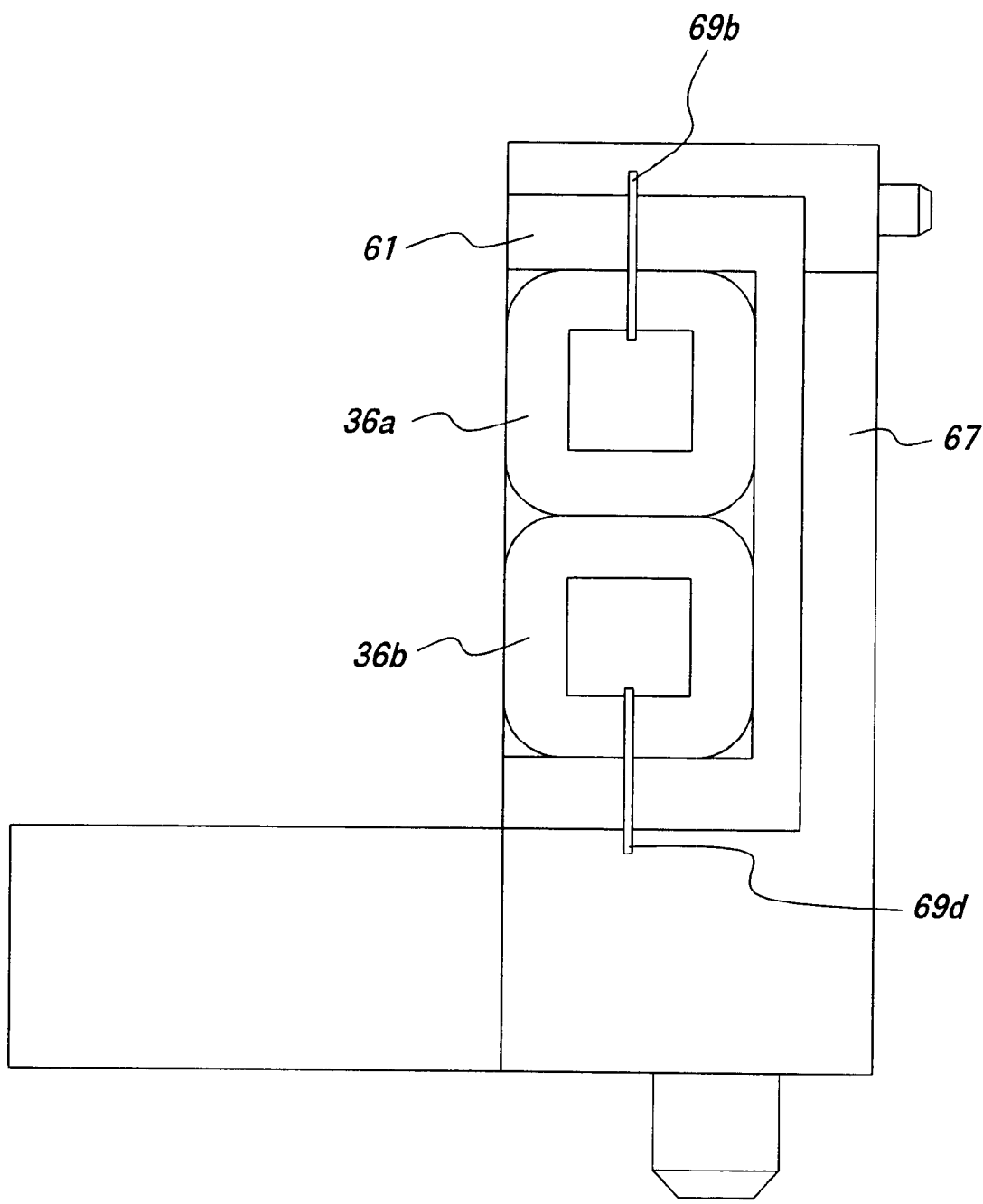
FIG. 19 is a cross sectional view of the galvanometer as the third preferred embodiment of the present invention.

Referring now to FIGS. 17 to 19, a galvanometer mirror as a third preferred embodiment of the present invention will be described.

In the present embodiment, first coils 62*a*, 62*b* are fixed on the opposite sides of the first holder 61, respectively. In addition, a set of second coils 63*a*, 63*b* is fixed on the first coil 62*a* and another set of second coils 63*c*, 63*d* is fixed on the first coil 62*b*, respectively.

The second coils 63*a*, 63*b* are arranged to face a bipolar magnet 64*a* and the second coils 63*c*, 63*d* are arranged to face a bipolar magnet 64*b*, respectively. In addition, yokes 65*a*, 65*b* are arranged to face the magnets 64*a*, 64*b*, respectively. These components are assembled in a second holder 67 together with the reflective mirror 66.

In the present embodiment, the elastic part is comprised of four springs 69*a*–69*d*. Each of the springs 69*a*–69*d* is shaped like a generally letter "S" and one end thereof is fixed on the first holder 61 by extending in parallel with an axis 68 and the other end thereof is fixed on the second holder 67 by extending in parallel with the axis 68. Consequently, the movable part comprising the first holder 61, the coils 62*a*–62*d* and the reflective mirror 66 becomes rotatable around the axes 68, 70.

Next, the operation of the present embodiment will be described as follows.

Forces are generated on the coils 62*a*, 62*b* as shown in FIG. 17 by feeding currents through the coils 62*a*, 62*b*, respectively, to allow the rotation of the movable part around the axis 68. On the other hand, forces are generated on the coils 63*a*–63*d* by feeding currents through the coils 63*a*–63*d*, respectively, to allow the rotation of the movable part around the axis 70.

According to the present invention, the generally S-shaped springs 69*a*–69*d* rotatable around the axes 68, 70 are arranged in parallel with the axis 68 which is one of the rotation axes, so that the magnetic circuit comprising the coils 62*a*, 62*b*, 63*a*–63*d*, the magnets 64*a*, 64*b* and the yokes 65*a*, 65*b* can be arranged in parallel with the axis 70 which is the other of the rotation axes without interference of the springs 69*a*–69*d*.

In addition, the magnets 64*a*, 65*b* and the yokes 65*a*, 65*b* can be entirely symmetric with respect to the axes 68, 70, respectively. Therefore, the barycenters of the respective axes 68, 70 and the barycenter of the movable part can be entirely coincident with each other. As a result, substantially no resonance occurs at the time of actuating the galvanometer mirror.

As will be easily recognized by persons skilled in the part, the present invention is not limited to the above embodiments and various modifications and changes may be made without departing from the scope of the present invention For instance, the galvanometer of the present invention may be applied on an optical deflecting system to be used in a measuring instrument, a pickup for optical recording or the like.

The above embodiments have been explained using the reflective mirror as the optical element. According to the present invention, alternatively, the optical element may be of a prism, a lens, or a combination thereof. For detecting the inclination of the movable part, i.e., the optical element such as the reflective mirror, in stead of the above PSD, a photo disk (PD) split in four parts on the plane in the X—Y directions may be used.

In the above embodiments, the galvanometer mirror having two rotation axes has been explained. According to the present invention, alternatively, a single rotation axis or more than two rotation axes may be used. In the case of a galvanometer mirror using a single rotation axis, for example in the first embodiment, two coils that generate torque in one direction may be arranged on the movable part such that the coils are not coupled with each other on the movable part and they receive the supply of power through four springs. Also, a comparatively thin spacer made of a non-conductive material (e.g., 0.1 mm in thickness) may be inserted in the middle of each spring to form eight independent power supply lines in total. In this case, therefore, the individual power supplies to four coils two sets of coils and the power supply to the optical element for the sensor arranged on the movable part can be performed through the springs. In addition, the number of the springs is not limited to four. Alternatively, the number of the springs may be eight. In this case, four of eight springs may receive the supply of power without supplying to the rest of them. In addition, each of eight terminals in total of both ends of four coils may receive the supply of power though eight springs.

Figure 11:
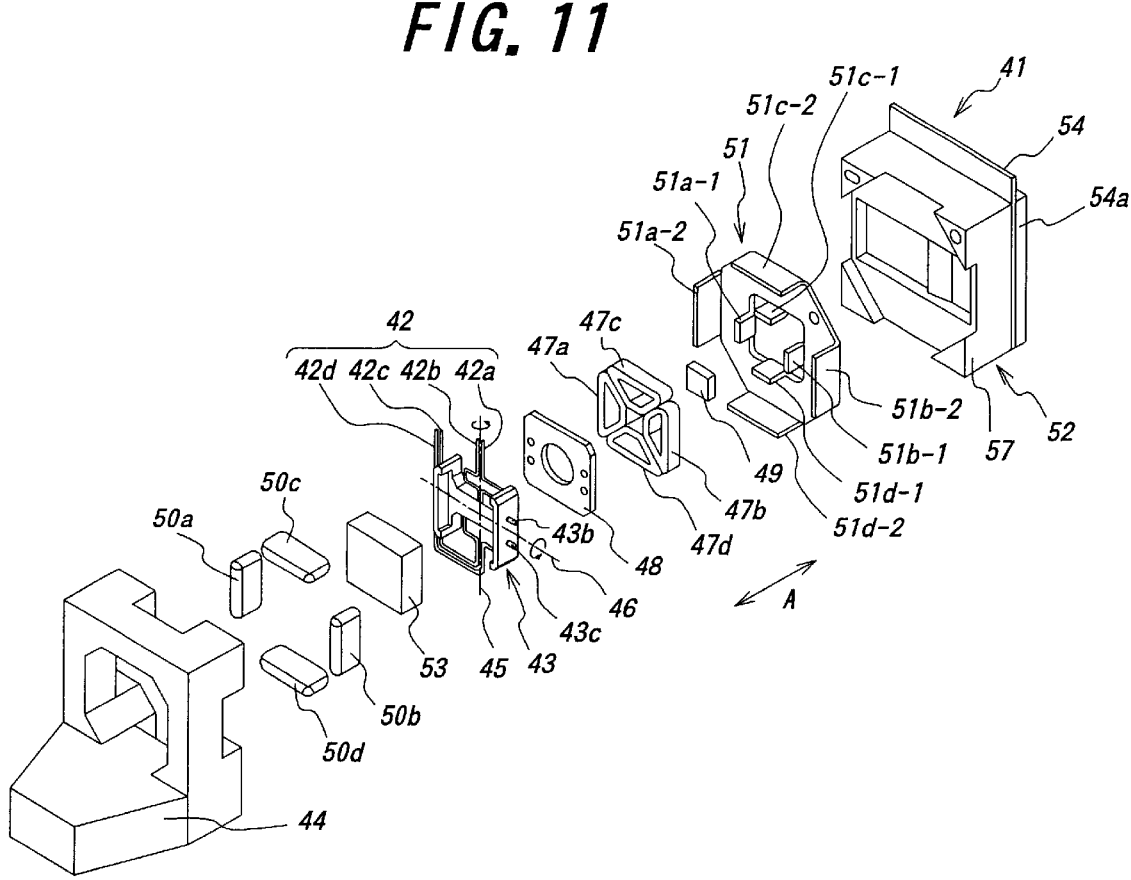
FIG. 11 is an exploded perspective view of the galvanometer mirror as the second preferred embodiment of the present invention.
Figure 12:
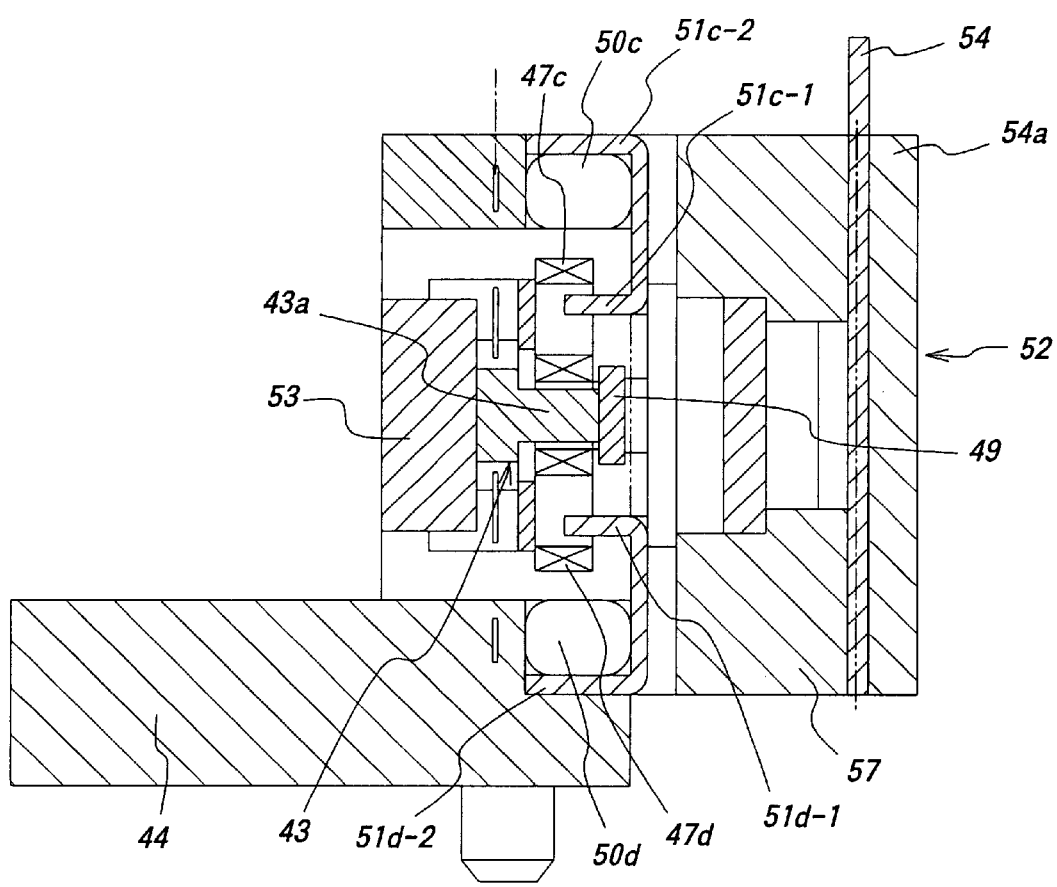
FIG. 12 is a cross sectional view of the galvanometer mirror as the second preferred embodiment of the present invention.

In the above second embodiment, in stead of the rotation around the axes 45, 36, the movable part may rate around the axis 45 or move in parallel with the direction perpendicular to the reflective surface of the mirror 53 (i.e., in the direction along the arrow A in FIG. 11). In this case, the coil parts 47*c*, 47*d* of the second coil are omitted and four springs 42*a*–42*d* perform the supply of power to four terminals in total of two coil parts 47*a*, 47*b*.

If the forces generated on the portions of two coil parts 47*a*, 47*b* facing to the magnets 50*a*, 50*b* are directed in the opposite directions with respect to each other, the reflective mirror 53 rotates around the axis 45. On the other hand, if the forces generated on the portions of two coil parts 47*a*, 47b facing to the magnets 50a, 50b are directed in the same direction with respect to each other, the reflective mirror 53 moves in the direction perpendicular to the reflective surface of the reflective mirror 53 (i.e., in the direction A).

If such a galvanometer mirror uses an optical pickup for regenerating optically recorded data, for example, the galvanometer inclines a beam of light by the rotation around the axis 45 for performing a tracking movement and also performs the offset correction by moving in the direction A at the time of the tracking movement.

What is claimed is:

1. A galvanometer mirror comprising:
   a movable part having an optical element and a plurality of coils;
   a supporting part for supporting said movable part so that said movable part can be inclined around an axis; and
   a fixed part having at least a magnetic circuit for applying a magnetic field to said coils,
   wherein said supporting part has an electric conductive elastic part that inclines said movable part around said axis as a result of torque around said axis caused by said magnetic field and supplies electric power to said coils.

2. The galvanometer mirror according to claim 1, wherein said supporting part extends in a direction along said axis.

3. The galvanometer mirror according to claim 1, wherein said supporting part has a first portion extending in a direction along said axis and a second portion extending in a direction along another axis perpendicular to said axis.

4. The galvanometer mirror according to claim 1, wherein said movable part is supported so as to be inclined around said axis and inclined around another axis perpendicular to said axis.

5. The galvanometer mirror according to claim 4, wherein said elastic part includes four springs, wherein each of said springs comprises:
   a first end portion that extends along said axis and is fixed on said movable part;
   a second end portion that extends along said another axis and is fixed on said fixed part; and
   a coupling part for coupling said first end portion and said second end portion.

6. The galvanometer mirror according to claim 1, wherein said elastic part comprises at least four independent springs.

\* \* \* \* \*